(12) United States Patent
Hoekstra et al.

(10) Patent No.: US 8,009,609 B2
(45) Date of Patent: Aug. 30, 2011

(54) MAINTAINING QUALITY OF SERVICE FOR WIRELESS COMMUNICATIONS

(75) Inventors: Geert Jan Hoekstra, Amersfoort (NL); Franciscus Panken, Bussum (NL)

(73) Assignee: Alcatel Lucent, Paris (FR)

( * ) Notice: Subject to any disclaimer, the term of this patent is extended or adjusted under 35 U.S.C. 154(b) by 1042 days.

(21) Appl. No.: 11/450,546

(22) Filed: Jun. 9, 2006

(65) Prior Publication Data

US 2007/0286114 A1      Dec. 13, 2007

(51) Int. Cl.
*H04W 3/08*       (2006.01)
(52) U.S. Cl. ........ 370/328; 370/329; 370/230; 370/468; 370/252; 370/395.21; 370/235; 370/445; 370/332
(58) Field of Classification Search .................. 370/329, 370/328, 230, 468, 252, 395.21, 235, 445, 370/332
See application file for complete search history.

(56) References Cited

U.S. PATENT DOCUMENTS

| 6,363,429 | B1 | 3/2002 | Ketcham | |
|---|---|---|---|---|
| 6,414,938 | B1* | 7/2002 | Corke et al. | 370/231 |
| 6,680,930 | B2* | 1/2004 | Newberg et al. | 370/348 |
| 7,123,614 | B2* | 10/2006 | Frouin et al. | 370/389 |
| 2002/0093983 | A1* | 7/2002 | Newberg et al. | 370/468 |
| 2002/0145982 | A1* | 10/2002 | Talpade et al. | 370/253 |
| 2003/0007456 | A1* | 1/2003 | Gupta et al. | 370/232 |
| 2003/0128749 | A1* | 7/2003 | Bruas | 375/222 |
| 2003/0174707 | A1* | 9/2003 | Grob et al. | 370/394 |
| 2004/0114553 | A1* | 6/2004 | Jiang et al. | 370/328 |
| 2004/0242235 | A1 | 12/2004 | Witana | |
| 2005/0099979 | A1* | 5/2005 | Chandra | 370/338 |
| 2005/0100045 | A1* | 5/2005 | Hunkeler et al. | 370/465 |
| 2006/0039333 | A1* | 2/2006 | Pirzada et al. | 370/338 |
| 2006/0133322 | A1* | 6/2006 | Vannithamby et al. | 370/335 |
| 2007/0263653 | A1* | 11/2007 | Hassan et al. | 370/437 |

FOREIGN PATENT DOCUMENTS

WO         02084920 A2    10/2002
WO      2004077727 A2     9/2004

OTHER PUBLICATIONS

International Search Report and Written Opinion of the International Searching Authority for International application No. PCT/US2007/013466 mailed Dec. 21, 2007.

(Continued)

*Primary Examiner* — Kwasi Karikari
(74) *Attorney, Agent, or Firm* — Carlson, Gaskey & Olds, PC

(57) ABSTRACT

A method for managing wireless communications includes establishing a quality of service budget on behalf of a wireless station. A service profile is established by determining an average packet size for at least one flow for the wireless station and an average packet frequency for that flow. When more than one flow from a wireless station is desired, the average packet size and average packet frequency for all such flows are combined. The average packet size and average packet frequency are used to determine a capacity consumption for the wireless station. That capacity consumption is then used to determine a threshold transmission speed above which transmission from the wireless station must stay to achieve a guaranteed quality of service level. Allocation of wireless capacity for the wireless station is based upon the determined threshold transmission speed.

17 Claims, 2 Drawing Sheets

OTHER PUBLICATIONS

Voice Capacity of IEEE 802.11b and 802.11a Wireless LANS in the Presence of Channel Errors and Different User Data Rates; Kamesh Medepalli, Praveen Gopalakrishnan, David Famolari and Toshikazu Kodama, Mobile Netowrking Research—Telcordia Technologies; 0-7803-8521-7/04/$20.00@2004 IEEE, pp. 4543-4547.

Admission Control in IEEE 802.11e Wireless LANs; Deyun Gao and Jianfei Cai, Nanyang Technological University, Singapore; King Ngi Ngan, Chinese University of Hong Kong, Hong Kong; 0890-8044/05/$20.00@2005 IEEE; IEEE Network, Jul./Aug. 2005, pp. 6-13.
International Preliminary Report on Patentability for International application No. PCT/US2007/013466 mailed Dec. 24, 2008.

* cited by examiner

MAINTAINING QUALITY OF SERVICE FOR WIRELESS COMMUNICATIONS

FIELD OF THE INVENTION

This invention generally relates to communication. More particularly, this invention relates to wireless communications.

DESCRIPTION OF THE RELATED ART

Wireless communication systems are well known and in widespread use. Cell phones and other wireless stations such as notebook computers and personal digital assistants are being increasingly used for voice and data communications. It is becoming increasingly popular to provide local area network services for such wireless stations. Wireless local area networks (WLANs) have the potential of offering even more wireless communication capabilities in addition to those already available.

WLANs have been successfully used as home and "last-mile" technology. If the subscription and use of real-time multimedia applications increases, the demand increases for the support of end-to-end quality of service guarantees in wired and wireless networks. As WLANs move into enterprise and public areas with increasing demand for real-time applications, the demand for quality of service increases. Additionally, this introduces a need to distinguish among wireless stations communicating using the WLAN. Especially when offered in a commercial or public context, WLANs will have to meet user expectations regarding throughput, delays, jitter and availability of the network. Offering network services transparently to end-users in a converged network environment requires a resource allocation mechanism and quality of service guarantee for WLAN access networks that is similar to existing cell phone networks.

The multiple access control (MAC) layer of a WLAN increases the reliability by including overhead required for the physical medium and by forcing an acknowledgement of each packet. In the case of mobile wireless stations, the distance between the wireless station and the access point can vary over time. If the distance increases, the transmission speed of a wireless station decreases as a result of rate adaptation and the overhead associated with the WLAN acknowledgements requires relatively more air time, resulting in substantial and non-linear overhead. In particular, real-time applications often operate at relatively high packet rates and consume a large amount of WLAN air time or capacity when compared to the transported application data.

A draft IEEE 802.11e standard attempts to address this inefficiency by introducing block acknowledgements. The proposed IEEE 802.11e standard requires reserving network capacity on a per-flow basis but there are no explained ways for how an access point can guarantee the quality of service level for each flow.

When an application requests network connectivity, the wireless station or terminal negotiates with a quality of service entity in the network about a set of network parameters needed to assure the end-to-end quality of service of the application. Some contention-based WLAN variants have been proposed. These can basically be grouped into measurement-based admission control schemes and model-based admission control schemes. The first group makes decisions based on measuring network conditions while the second group constructs performance models and metrics to evaluate the status of the network and the quality of service flows. Two references in this area are: D. Gaoa, J. Caia, K. Ngi Nganb "Admission Control in IEEE 802.11e Wireless LANs" IEEE Network July-August 2005, pp. 6-13; and K. Medepalli, P. Gopalakrishnan, D. Famolari and T. Kodama, "Voice Capacity of IEEE 802.11b, 802.11a and 802.11g Wireless LANs", Proceedings of IEEE Globecom 2004, Dallas, December 2004.

Solutions that express the load of a network in bits per second are generally acceptable for fixed network infrastructures. Such solutions, however, are not applicable for a WLAN MAC layer where the overhead required for the physical medium and for acknowledging each packet varies as a result of varying channel conditions, mobility or both. Traffic service agreements should be defined and guaranteed at the IP layer such that the variations in packet delay and the variations of the conditions of the wireless channel can be kept transparent for higher layer applications. This requires a different solution for traffic profile handling. It would also be desirable to facilitate maintaining the quality of service guarantees under varying WLAN channel conditions, since the load of a WLAN is not uniquely determined. The WLAN channel environment is particularly challenging. Operation takes place in unlicensed spectrum where interference from other devices is common and the channel propagation properties can very widely with movement of wireless devices or objects in their vicinity. Such variability makes maintaining quality of service particularly difficult yet a guaranteed quality of service is necessary.

The load expressed in bits per second, therefore, gives an inaccurate estimate of the air time consumed by a WLAN station or a group of them.

There is a need for an improved technique for guaranteeing a quality of service for wireless communications such as those occurring in WLANs.

SUMMARY OF THE INVENTION

An exemplary method of managing wireless communications includes determining a threshold transmission speed above which a transmission speed between a wireless station and an access point must stay to achieve a desired quality of service level for the wireless station. Wireless communication capacity is allocated for at least one communication between the wireless station and the access point based on the determined threshold transmission speed.

In one example, the access point comprises a portion of a wireless local area network.

One example includes determining an average packet size associated with at least one type of traffic transmitted by the wireless station. An average packet frequency is associated with the at least one type of traffic transmitted by the wireless station is also determined. One example includes determining the threshold transmission speed based upon the determined average packet size and the determined average packet frequency.

One example includes collectively using the average packet frequency and the average packet size for a plurality of flows for a particular wireless station for purposes of determining the threshold transmission speed.

One example includes determining when a transmission speed for a communication between the wireless station and the access point falls below the determined threshold speed and attempting to adjust an allocation of wireless capacity for the wireless station to maintain a quality of service level associated with the determined threshold speed.

The various features and advantages of this invention will become apparent to those skilled in the art from the following detailed description. The drawings that accompany the detailed description can be briefly described as follows.

DETAILED DESCRIPTION

This invention relates to guaranteeing quality of service in wireless communication systems. A disclosed example described below is useful in wireless local area network (WLAN) implementations, for example. Allocating capacity of the wireless system for a wireless station is based upon a determined budget for individual flows or an overall quality of service budget for a wireless station, which corresponds to a determined threshold transmission speed for communications between the wireless station and the access point. With the example technique, wireless stations can decide individually which traffic flow receives priority, which makes interaction with a network about reservation for individual traffic flows potentially obsolete.

Figure 1:
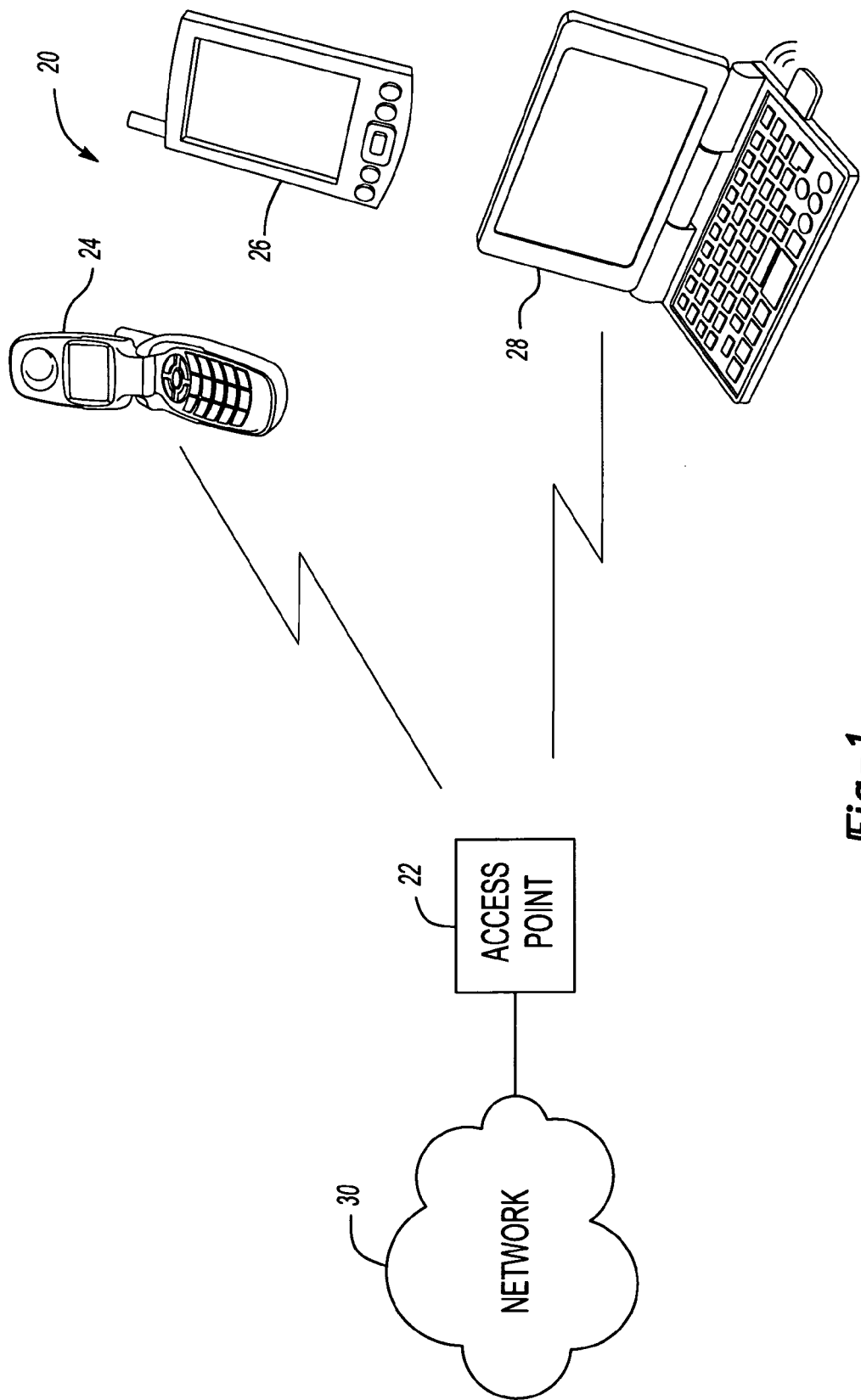
FIG. 1 schematically illustrates selected portions of a wireless communication system that is useful with an embodiment of this invention.

FIG. 1 schematically illustrates selected portions of a wireless communication system. In this example, a WLAN access point (AP) 22 operates in a generally known manner to facilitate wireless communications for a plurality of wireless stations. The illustrated example includes mobile wireless stations such as a cell phone 24, a personal digital assistant 26 and a notebook computer 28.

The AP 22 communicates with a network 30 to facilitate communications on behalf of the wireless stations 24-28 with other, remotely located devices, for example. The communications between the AP 22 and the network 30 may occur over wire line connections, be wireless or a combination of them.

Figure 2:
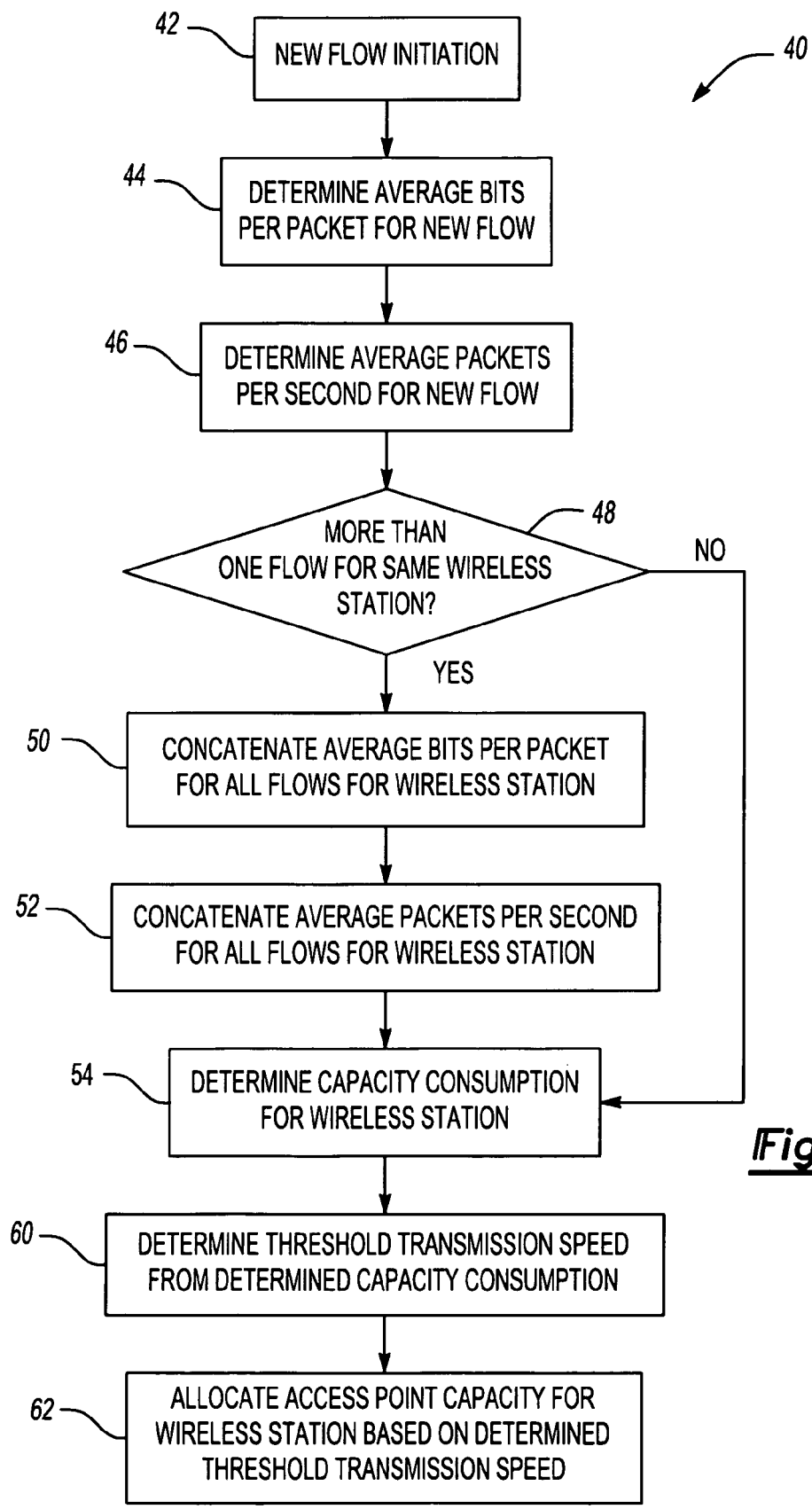
FIG. 2 is a flowchart diagram summarizing one example approach.

FIG. 2 includes a flowchart diagram 40 that summarizes one example approach of managing wireless communications between the AP 22 and one or more of the wireless stations 24-28. This example approach is useful for allocating some of the wireless capacity of the AP 22 to at least one of the wireless stations to guarantee a quality of service level for a communication on behalf of that wireless station. The disclosed example accommodates differences between transmission speeds of the wireless stations based upon the type of flow, the position of the wireless station relative to the AP 22, movement of a wireless station or other interference or varying channel condition that may be introduced by movement of another device in the vicinity of the wireless station, for example. This disclosed example takes a unique approach to establishing a quality of service budget on behalf of a wireless station.

The flowchart diagram 40 begins at 42 where a new flow is initiated. This may occur, for example, at the negotiation phase between a wireless station and the AP 22 to establish a particular type of communication or flow. At least two traffic values are determined to establish a traffic profile for the wireless station. At 44, an average packet size (e.g., an average number of bits per packet) for the new flow is determined. An average number of packets per second for the new flow is determined at 46. The average number of packets per second can also be referred to as the average packet frequency for the flow.

In some examples, only one flow will be involved in establishing the appropriate quality of service budget for the wireless station. In other examples, more than one flow may be desired from a particular station for multimedia communications, for example. The example of FIG. 2 includes a step at 48 for determining whether there is more than one flow for the same wireless station. In this example, there are n flows.

When a wireless station has more than one flow, the average bits per packet or the average packet size for all n flows for that wireless station is determined at 50. One example includes concatenating or summing the average packet size for all of the flows to determine an overall average packet size BPP (e.g., bits per packet). One example includes using the equation $$BPP = \frac{\sum_{i=1}^{n} BPP_i * PPS_i}{PPS}$$

As shown at 52 in FIG. 2, the average packet frequency is determined for all of the n flows for the wireless station. The PPS (e.g., packets per second) in one example is determined using the following equation $$PPS = \sum_{i=1}^{n} PPS_i$$

The product of the two formulas above (i.e., PPS×BPP) provides the rate of transmission for a particular wireless station. The two quantities BPP and PPS provide a multi-service traffic profile that is useful to define the wireless stations' overall quality of service profile. This profile can be assigned to a particular direction (upstream or downstream), or it can hold for both directions concurrently.

Each wireless station operates within the limits of a service contract, which determines a budget for a subscriber. Using BPP and PPS together allows for determining if a particular service contract budget can be met, given a current load, for example. Various levels of a service contract can be determined, each corresponding with a different combination of the tuple (BPP, PSS). Several multi-service traffic profiles can subsequently be assigned to the station. For example, one tuple (BPP$_{peak}$, PPS$_{peak}$) can be assigned as peak profile whereas another tuple (BPP$_{committed}$, PPS$_{committed}$) can be assigned as committed profile. As the terms suggest, the committed profile is committed by the network, whereas the peak profile can be used when the conditions allow this. This example provides greater flexibility in assigning a budget to a wireless station.

The combination of BPP and PPS also allow for determining traffic behavior and expressing that behavior in terms of BPP and PPS.

Given the two values associated with either of the committed profile or the determined traffic behavior, this example provides for determining a threshold transmission speed and taking action if necessary if the threshold transmission speed value cannot be met.

Whether there is one flow or multiple flows, a capacity consumption for the wireless station is determined at 54 in the example of FIG. 2. Capacity or resource consumption k corresponding with the multi-service traffic profile can be determined from the following relationship $$\kappa = PPS_{peak} * \left\{ \left\lceil \frac{BBP_{peak} + OH}{216} \right\rceil * \frac{216}{54*10^6} + 2*PLCP + \left\lceil \frac{ACK}{216} \right\rceil * \frac{216}{BSR} + SIFS + DIFS + CW \right\}$$

where OH is the overhead that each packet requires (e.g., 600 bits), PLCP is the physical layer overhead for sending each packet on the air interface, ACK is an acknowledgement, SIFS is the short inter-frame space, DIFS is the distributed inter-frame space, CW is the contention window and BSR is the basic service rate. Each of these parameters is defined, for example, in the IEEE 802.11 standard. This particular example is useful, for example for IEEE802.11a or IEEE802.11g WLANs where there are no old IEEE802.11b stations associated and for situations where stations do not use Request to Send or Clear to Send (RTC/CTS) signaling. The notation [a] is used in this example to denote rounding up a value of a corresponding parameter a to the next larger integer when the value of a is not an integer (e.g., [25.65] becomes 26).

Alternatively, κ can be a fixed value based on a chosen percentage of an available capacity. For example, the access point or another portion of the network may decide to allow a station 50% of an available consumption rate for a given communication session. In that case κ is set as a fixed number, accordingly.

The relationship expressed above indicates the airtime that a wireless station will consume if it sends at the highest possible rate for the flows included within the multi-service traffic profile.

Providing quality of service support in this example includes the AP 22 guaranteeing the committed profile announced to the wireless station. A threshold transmission speed TS is used to indicate the capacity consumption of a wireless station that must be utilized to guarantee the committed quality of service. In one example, the threshold speed is determined based upon the determined capacity consumption k. This can be expressed as follows $$TS = \frac{216 * \left\lceil \frac{BPP_{committed} + OH}{216} \right\rceil}{\frac{\kappa}{PPS_{committed}} - 2*PLCP - \left\lceil \frac{ACK}{216} \right\rceil * \frac{216}{BSR} - SIFS - DIFS - CW}$$

In this example, TS replaces the parameter $54 \times 10^6$ in the previous equation, which is equivalent to a 54 Mbit per second rate.

The determined threshold TS expresses the transmission speed needed for a wireless station to continue sending the committed set of profiles (e.g., based upon the determined BPP and PPS) successfully. This is shown schematically at 60 in FIG. 2. The capacity or amount of resource from the AP 22 then is allocated for the wireless station so that the determined threshold transmission speed can be maintained. This is schematically shown at 62 in FIG. 2.

The allocation of capacity based upon the determined threshold transmission speed may occur during the negotiation phase for setting up a communication session between a wireless station and the AP 22, for example. It may also be useful for adjusting the capacity allocation during a communication session.

For example, a wireless station may initiate a new flow, which requires determining a new threshold transmission speed and the AP 22 can the make a new capacity allocation, if needed. Additionally, it is possible for one example AP 22 to determine if a wireless station transmission speed drops below the threshold transmission speed. In such a situation, the AP 22 cannot guarantee the quality of service level that was previously announced. For such situations, the AP 22 may notify the wireless station regarding the situation, increase the quality of service budget for the wireless station, degrade the quality of service budget for other wireless stations in favor of the one that is in trouble or a combination of these.

The formulas above hold for the situation that the WLAN access supports IEEE 802.11a or (solely) IEEE802.11g stations. Two other cases can be distinguished, namely solely IEEE802.11b stations, and a situation where both IEEE802.11b and IEEE802.11g stations are associated to the same WLAN. In addition, stations may use the RTS/CTS (Request-to-send/Clear-to-send) mechanism to minimize the re-sending of large data packets. The RTS/CTS mechanisms can be activated on the station. The formulas for these cases differ slightly from one another and from the formulas above.

For situations including IEEE802.11 stations:

$$\kappa = PPS_{peak} *$$
$$\left\{ \frac{BPP_{peak} + OH}{11*10^6} + 2*PLCP + ACK/BSR + SIFS + DIFS + CW \right\}$$

$$TS = \frac{BPP_{committed} + OH}{\frac{\kappa}{PPS_{committed}} - 2*PLCP - \left\lceil \frac{ACK}{BSR} \right\rceil - SIFS - DIFS - CW}$$

In this case, the values for PLCP, DIFS and BSR are different, namely DIFS=50 ms, PLCP is 192 ms and BSR equals the basic service set rate for the 802.11b medium: 1/2/5,5/11 Mbit/s.

For IEEE802.11g users in the case where one or more IEEE802.11b users are associated with the same access point and compete for the same WLAN transmission r rights:

$$\kappa = PPS_{peak} * \left\{ \left\lceil \frac{BPP_{peak} + OH}{216} \right\rceil * \frac{216}{54*10^6} + 3*PLCP + \left\lceil \frac{ACK}{216} \right\rceil * \frac{216}{BSR} + \left\lceil \frac{CTS}{216} \right\rceil * \frac{216}{BSR} + 2*SIFS + DIFS + CW \right\}$$

$$TS = \frac{216 * \left\lceil \frac{BPP_{committed} + OH}{216} \right\rceil}{\frac{\kappa}{PPS_{committed}} - 3*PLCP - \left\lceil \frac{ACK}{216} \right\rceil * \frac{216}{BSR} - \left\lceil \frac{CTS}{216} \right\rceil * \frac{216}{BSR} - 2*SIFS - DIFS - CW}$$

For stations where the stations associated with a WLAN are using the RTS/CTS mechanism:

$$K = PPS_{peak} * \left\{ \left\lceil \frac{BPP_{peak} + OH}{216} \right\rceil * \frac{216}{54*10^6} + 4*PLCP + \left\lceil \frac{RTS}{216} \right\rceil * \frac{216}{54*10^6} + \left\lceil \frac{ACK}{216} \right\rceil * \frac{216}{BSR} + \left\lceil \frac{CTS}{216} \right\rceil * \frac{216}{BSR} + 3*SIFS + DIFS + CW \right\}$$

$$TS = \frac{216 * \left( \left\lceil \frac{BPP_{committed} + OH}{216} \right\rceil + \left\lceil \frac{RTS}{216} \right\rceil \right)}{\frac{K}{PPS_{committed}} - 4*PLCP - \left\lceil \frac{ACK}{216} \right\rceil * \frac{216}{BSR} - \left\lceil \frac{CTS}{216} \right\rceil * \frac{216}{BSR} - 3*SIFS - DIFS - CW}$$

The disclosed example allows for defining a traffic service level agreement on an IP layer but still allows for meeting desired quality of service levels on behalf of a wireless station that is connected to the network through a WLAN.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of managing wireless communications, comprising
    determining a threshold transmission speed above which a transmission speed between a wireless station and an access point must stay to achieve a desired quality of service level for the wireless station;
    allocating wireless communication capacity for at least one communication between the wireless station and the access point based on the determined threshold transmission speed;
    wherein determining the threshold transmission speed includes
        determining an average packet size associated with at least one type of traffic transmitted by the wireless station;
        determining an average packet frequency associated with the at least one type of traffic transmitted by the wireless station;
        determining a wireless capacity consumption based upon the determined average packet size and the determined average packet frequency; and
        determining the threshold transmission speed based upon at least a portion of the determined wireless capacity consumption, the threshold transmission speed being different than the determined wireless capacity consumption.

2. The method of claim 1, wherein the access point comprises a portion of a wireless local area network.

3. The method of claim 1, comprising
    determining the average packet size for at least one flow for the wireless station.

4. The method of claim 3, comprising
    determining the average packet size for a plurality of flows for the wireless station; and
    determining the threshold transmission speed based upon all of the determined average packet sizes for the wireless station.

5. The method of claim 1, comprising
    determining the average packet frequency for at least one flow for the wireless station.

6. The method of claim 5, comprising
    determining the average packet frequency for a plurality of flows for the wireless station; and
    determining the threshold transmission speed based upon all of the determined average packet frequencies for the wireless station.

7. The method of claim 1, comprising
    determining the wireless capacity consumption as a function of a highest possible transmission speed from the wireless station.

8. The method of claim 1, comprising
    determining if a transmission speed from the wireless station is below the threshold transmission speed; and
    adjusting the allocated capacity for the wireless station if the determined transmission speed is below the threshold transmission speed.

9. The method of claim 1, comprising determining a capacity consumption rate for the wireless station as a set percentage of an available consumption rate.

10. A method of managing wireless communications, comprising:
    determining a threshold transmission speed above which a transmission speed between a wireless station and an access point must stay to achieve a desired quality of service level for the wireless station, the transmission speed being different than a capacity consumption by the wireless station;
    allocating wireless communication capacity for at least one communication between the wireless station and the access point based on the determined threshold speed;
    determining if a transmission speed from the wireless station is below the threshold transmission speed; and
    increasing the allocated capacity for the wireless station if the determined transmission speed is below the threshold transmission speed.

11. The method of claim 10, wherein the access point comprises a portion of a wireless local area network.

12. The method of claim 10, comprising
    determining an average packet size associated with at least one type of traffic transmitted by the wireless station;
    determining an average packet frequency associated with the at least one type of traffic transmitted by the wireless station; and
    determining the threshold transmission speed based upon the determined average packet size and the determined average packet frequency.

13. The method of claim 12, comprising
    determining the average packet size for a plurality of flows for the wireless station; and
    determining the threshold transmission speed based upon all of the determined average packet sizes for the wireless station.

14. The method of claim 12, comprising
determining the average packet frequency for a plurality of flows for the wireless station; and
determining the threshold transmission speed based upon all of the determined average packet frequencies for the wireless station.

15. The method of claim 12, comprising
determining a wireless capacity consumption based upon the determined average packet size and the average packet frequency; and
determining the threshold transmission speed based upon at least a portion of the wireless capacity consumption.

16. The method of claim 15, comprising
determining the wireless capacity consumption as a function of a highest possible transmission speed from the wireless station.

17. The method of claim 10, comprising determining a capacity consumption rate for the wireless station as a set percentage of an available consumption rate.

* * * * *